United States Patent
Bahuguna et al.

[11] Patent Number: 6,038,043
[45] Date of Patent: Mar. 14, 2000

[54] METHOD FOR RECORDING A HOLOGRAPHIC OPTICAL ELEMENT

[75] Inventors: Ramendra D. Bahuguna; Thomas M. Corboline, both of San Jose, Calif.

[73] Assignee: Advanced Precision Technology Inc, San Francisco, Calif.

[21] Appl. No.: 08/814,041

[22] Filed: Mar. 10, 1997

Related U.S. Application Data

[62] Division of application No. 08/499,673, Jul. 7, 1995, Pat. No. 5,629,764.

[51] Int. Cl.⁷ .............................. G03H 1/00; G03H 1/26; G02B 5/32
[52] U.S. Cl. ................................ 359/30; 359/15; 359/22; 359/1
[58] Field of Search .................... 359/1, 10, 12, 359/13, 30, 35, 15; 430/1

[56] References Cited

U.S. PATENT DOCUMENTS

| | | | |
|---|---|---|---|
| 4,834,474 | 5/1989 | George et al. | 359/15 |
| 5,672,448 | 9/1997 | Isogai et al. | 359/22 |
| 5,682,255 | 10/1997 | Friesem et al. | 359/15 |

*Primary Examiner*—Cassandra Spyrou
*Assistant Examiner*—Audrey Chang
*Attorney, Agent, or Firm*—David E. Newhouse, Esq.

[57] ABSTRACT

A fingerprint sensor having a holographic phase grating glued on one right angle surface of a prism is described where a light source oriented normally relative to the hypotenuse surface of the prism illuminates an interface of the grating and finger surface. Incident light rays are refracted and absorbed where ridges of the finger surface contact the grating surface, whereas light rays are totally internally reflected in areas between and pores in finger surface ridges not in contact the grating surface. The reflected light rays, diffracted by the holographic phase grating, propagate normally ($\perp$) back into the right angle prism where they are reflected normally ($\perp$) out the remaining right angle surface of the prism by a second total internal reflection at the internal hypotenuse surface of the prism. The reflected light rays emerging from the sensor contain high contrast, detailed images of the ridges and valleys of the finger surface including pores in the ridges, i.e., a high quality fingerprint image oriented in a plane normal to the optical axis. The holographic phase grating eliminates image distortion due dimensional compression, and there is no necessity for optically correcting astigmatism in the image before capture. Fingerprint images of a quality that allows resolution of pores on the finger surface ridges are reliably obtained making the invented fingerprint sensor ideally suited for providing input to fingerprint recording, recognition and verification systems.

5 Claims, 11 Drawing Sheets

METHOD FOR RECORDING A HOLOGRAPHIC OPTICAL ELEMENT

RELATED APPLICATIONS

This application is division of application Ser. No. 08/499,673 filed Jul. 7, 1995, now U.S. Pat. No. 5,629,764, in the United States of America by RAMENDRA D. BAHUGUNA and THOMAS M. CORBOLINE entitled "A PRISM FINGERPRINT SENSOR USING A HOLOGRAPHIC OPTICAL ELEMENT".

BACKGROUND OF THE INVENTION

1. Field of the Invention

The invention relates to generation and capture of high contrast, detailed optical fingerprint images, and in particular, to an optical sensor combining a right angle prism with a holographic phase grating to produce a fingerprint image without dimensional spatial distortion and astigmatism. The invention further relates to a method of constructing the holographic phase gratings for the invented fingerprint sensor

2. Description of the Prior Art

Total internal reflection has been used for a long time to optically sense ridges and valleys of a finger surface, i.e., to optically capture a fingerprint. H. J. Caulfield and D. R. Perkins, (Caulfield et al) in U.S. Pat. No. 3,716,301 teaches the use of a prism sensor based on total internal reflection in their holographic finger print recognition system. S. Igaki, S Eguchi, F. Yamagishi, H. Ikeda and T. Inagaki (Igaki et. al.) in a paper published in *Applied Optics,* Vol. 31, pp. 1794–1802 (1955), disclose a parallel plate sensor using total internal reflection in a flat glass plate to transport a captured fingerprint image in combination with a holographic grating both which retrieve the image reflecting within the plate and which corrects to a degree for dimensional aberration in that image. The device described by Igaki et. al. works in a scattering mode rather than absorption. Accordingly, image contrast is reversed with respect to that obtained by Caulfield et al., and a pair of cylindrical lenses are required for correcting astigmatism in the captured image.

More recently, M. Metz, C. Flatow, Z. Coleman and N. J. Phillips (M. Metz et. al.) have developed an edge lit hologram for capturing a fingerprint images not based on total internal reflection. [See *Laser Focus World,* May, 1994, pp. 159–163 and a paper entitled "The Use Of Edge-lit Holograms For Compact Fingerprint Capture" published in the *Conference Proceedings of "Card-Tech Secure-Tech 1995"* held Apr. 10–13, 1995, in Washington D.C., pp. 221–228.

The primary disadvantage of existing prism fingerprint sensors is that the fingerprint is compressed in one orthogonal dimension with respect to the other by a factor equal to the cosine of the angle at which the image plane is inclined relative to the normal. To explain, any image in a plane viewed at an angle 45° to the normal is compressed in one dimension by cos. (45°), i.e. by $1/\sqrt{2}$. [Right angle isosceles (45°) prisms are typically described for obtaining fingerprint images.]

Another serious drawback of existing prism fingerprint sensors is that the image plane of the fingerprint emerges from the various sensors inclined with respect to the optical axis. Accordingly, it usually necessary to optically and/or computationally reorient the image to a plane normal ($\perp$) to the optical axis for optimal resolution.

The glass plate sensor of S. Igaki et al utilizes a holographic grating to diffract internally reflected light propagating within a glass plate at an angle greater than the critical angle so that the wave can emerge from the plate into the air. S. Igaki et al specifically point out that to create such a grating, one of the two interfering light waves for constructing the hologram must meet the conditions of total internal reflection, that is light cannot enter the holographic recording plate from the air. S. Igaki et al then describe a complicated procedure for creating a suitable holographic grating involving a different wavelength of light. Finally, the glass plate holographic grating sensor described by S. Igaki et al has astigmatism because the spherically divergent waveforms scattered from a fingerprint ridges are diffracted by fringe planes of a holographic grating creating by planar waveforms.

SUMMARY OF THE INVENTION

The invented fingerprint sensor includes a holographic phase grating optically coupled with and forming a right angle surface of a prism which diffracts light totally internally reflecting from its external surface to propagate normally ($\perp$) back into the prism. In areas where the ridges of the finger surface are in contact with the grating surface the illuminating light is refracted and absorbed. In areas corresponding to valleys and pores of the finger surface not in contact with the grating surface, the illuminating light is totally internally reflected. The reflected light is diffracted by the holographic phase grating and emerges from the transmission surface of the prism producing a high contrast, detailed image of the ridges, pores and valleys of the finger surface sensor surface of the sensor oriented in a plane normal to the optical axis. In particular, the holographic phase grating eliminates image distortion due to dimensional compression. And, because the waveform of the image within and emerging from the invented sensor is planar, there is no necessity for optically correcting for astigmatism before recording the image electronically or in film. Nor is there any necessity for optically or computationally correcting or enhancing the recorded images thereafter.

A novel method for recording a holographic phase grating for the invented sensor includes the steps of: (a) Sandwiching an unexposed holographic plate optically between a right angle (transmission) surface of a right angled prism and a blackened glass plate using a suitable liquid such as isopropyl alcohol; (b) Exposing the holographic plate using a collimated laser beam split by amplitude division where a first beam is directed normally into a hypotenuse surface of the particular right angle prism, and a second beam is directed normally into the other right angle (transmission) surface of the prism, the second beam being totally internal reflected from the internal hypotenuse prism surface to propagate normally ($\perp$) toward the holographic plate; and (c) Removing, developing and bleaching the exposed holographic plate to provide a phase grating. The incident beams within the holographic plate create fringe planes bisecting the angle between the respective incident beams. The blackened glass plate optically coupled to the exterior surface of the holographic plate precludes total internal reflection of the first beam directed normally through the hypotenuse surface of the prism at that exterior surface of the holographic plate and absorbs/attenuates the constructing/interfering incident light beams transmitted by the holographic plate. The created holographic phase grating is then rotated 180° in its plane and recouped (glued) to the same (sensor) right angle surface of the particular or an identical prism to insure that light totally internally reflected from the exterior surface of the holographic phase grating is diffractied and directed perpendicularly back into the body of the prism. The primary advantages of the invented sensor derive from the fact that: (a) the emerging fingerprint images are free of dimensional distortion, i.e., are not elongated or compressed in one orthogonal dimension with respect to the other in the plane of the image; and (b) the waveforms of the fingerprint image are planar. Accordingly, fingerprint images generated from the invented fingerprint sensor require neither optical nor computational correction of dimensional aberration or astigmatism before capture or recording in film or electronically.

An important aspect of the invented sensor is that both white light and laser light, collimated or diffuse, (preferably filtered) can be used to illuminate the sensor face—finger surface interface through a prism. With diffuse laser-illumination, the diffuser should be rotated at a rate sufficient to average speckling out.

A feature of the invented fingerprint sensor is that latent fingerprints left on the sensing surface of the prism from previous use of the sensor are hardly noticeable with a diffuse illumination light source.

Most importantly, the high contrast, detailed output images provided by the invented fingerprint sensor are ideally suited for systems recording, recognizing and verifying fingerprints. In fact, fingerprint images obtainable with the invented sensor are of such quality to allow true resolution and actual measurement of pore distributions on finger surface ridges.

The quality of the images produced are also ideally suited for video and other electron scanning cameras both for real time display and digitization.

Still other features, aspects, advantages and objects of and provided by the invented combination of a holographic phase grating optically coupled to one surface of a right angle prism for providing high contrast, detailed fingerprint images oriented normally ($\perp$) to an optical axis utilizing total internal reflection phenomenon will become apparent and/or be more fully understood with reference to the following detailed explanation in context of drawings showing schematic embodiments of components of the respective optical elements thought necessary for simply and reliably producing such images.

DETAILED DESCRIPTION OF PREFERRED AND EXEMPLARY EMBODIMENTS

Figure 1:
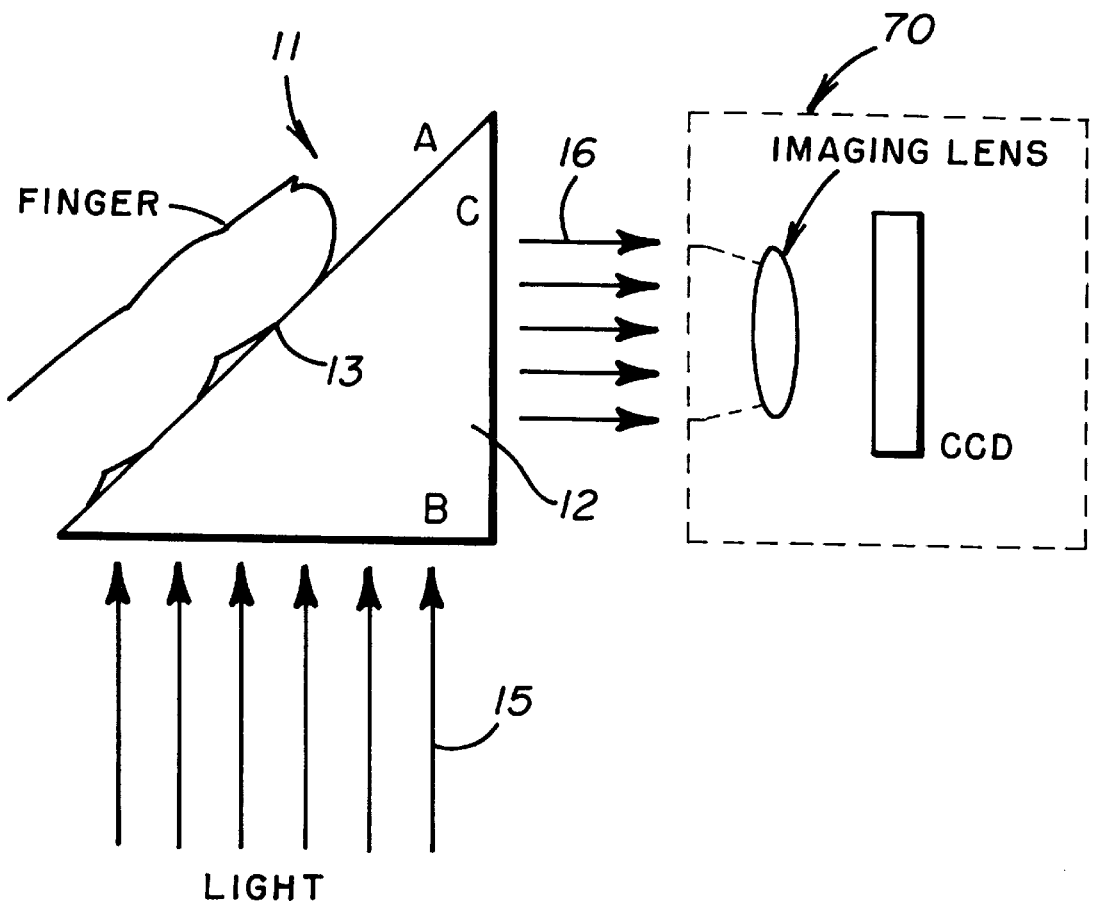
FIG. 1 is a schematic illustration of typical prior art fingerprint sensor using a prism.
Figure 8:
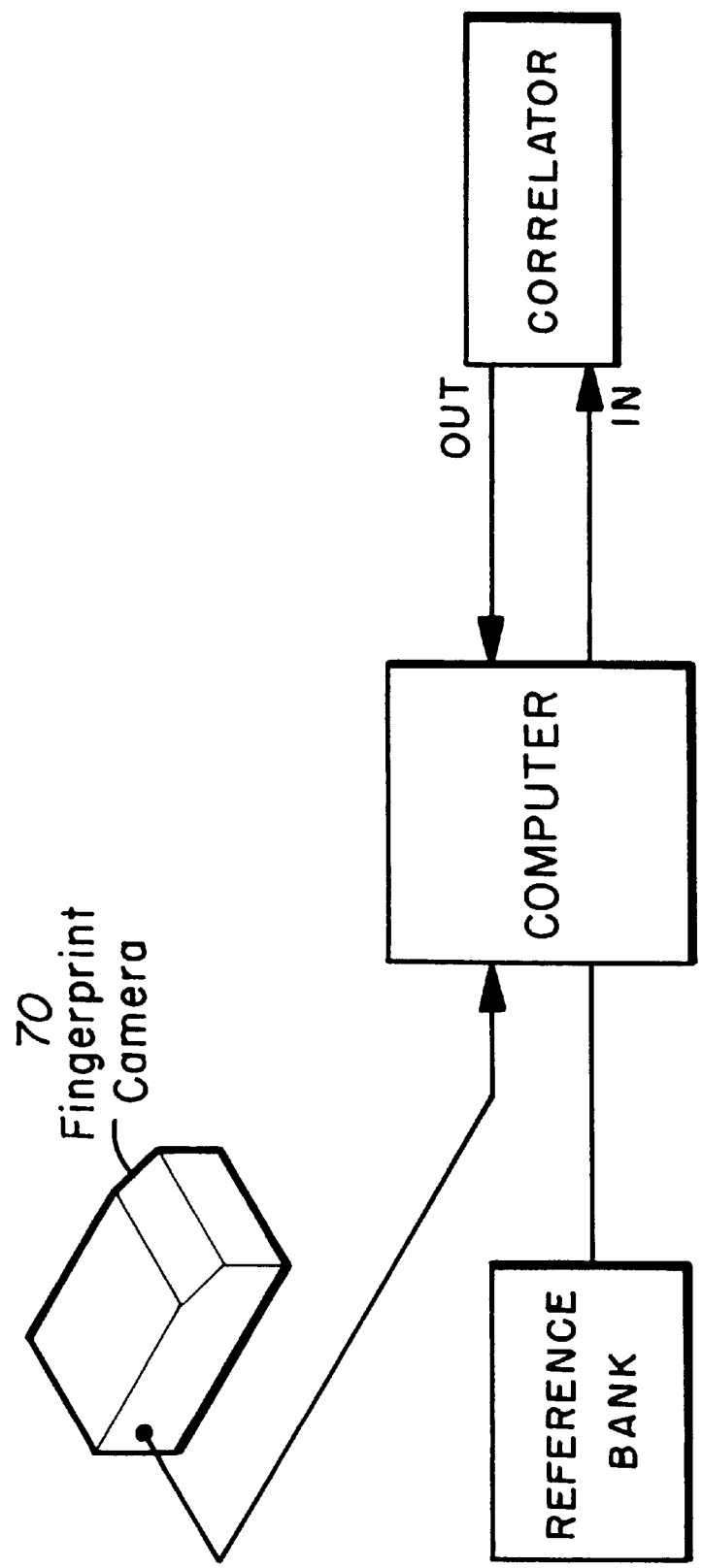
FIG. 8 illustrates the components of a typical fingerprint capture and recording system utilizing the invented fingerprint sensor.

Looking at FIGS. 1 & 8, the elements of a typical prior art fingerprint prism sensor 11 include a right angle (45°) prism 12 with a hypotenuse face A, a right angle light input surface B, and a right angle output surface C. As shown a finger is placed in contact with the exterior surface of the hypotenuse face A of the prism. The interface 13 between the finger surface and the exterior hypotenuse surface A of the prism 12 is illuminated by light from an exterior source (not shown), preferably collimated. The light rays propagate normally into the right angle light input surface B of the prism 12 as indicated by the arrows 15. The illuminating light is absorbed in areas where ridges on the finger surface contact the hypotenuse face A and is totally internally reflected in areas of the finger surface ridges not in contact with the surface A, i.e. the valleys and pores of the finger surface. The reflected light 16 propagates out the right angle output surface C of the prism, is imaged by the imaging lens and captured by an image recording mechanism CCD, (in this case a CCD photo sensor array or video camera). As shown in FIG. 8, the captured image is processed (digitized) using a computer then compared using a corrolator with data available from a reference bank to provide an indication of a match or mismatch.

Because the illuminated interface of the finger surface and hypotenuse face is inclined relative to the optical axis of the system, and the recording plane, the image captured from the right angle output surface C of the prism 12 is compressed in the (vertical) dimension of the right angle prism surface C by a factor equal to the Cosine of the angle of inclination of the image relative to the recording plane, or normal, i.e., in the example given by a factor f=cos. (45°)= 1/√2 or 0.7071. To optimize resolution, the captured image can thereafter be computationally corrected to eliminate the dimensional distortion. However, because such computational correction is typically performed after the image is recorded, detail compressed into, for example, 0.707 pixel, is effectively uniformly expanded into 1 pixel, when, in actual fact, such detail is not so uniformly distributed. This means that some detail will be lost. Accordingly, while computational correction of dimensional distortion of an image inclined relative to the recording plane post recordation may improve resolution, it also introduces error.

It is also possible to optically reorient inclined light images before recording. However, such optical systems are elaborate, typically requiring precision optical components and precise alignment. In the hurly burly world of capturing fingerprint images for recording, recognition and verification, the task of and the prospects for maintaining such precision alignment of multiple optical elements over time are both daunting and unrealizable.

Figure 2:
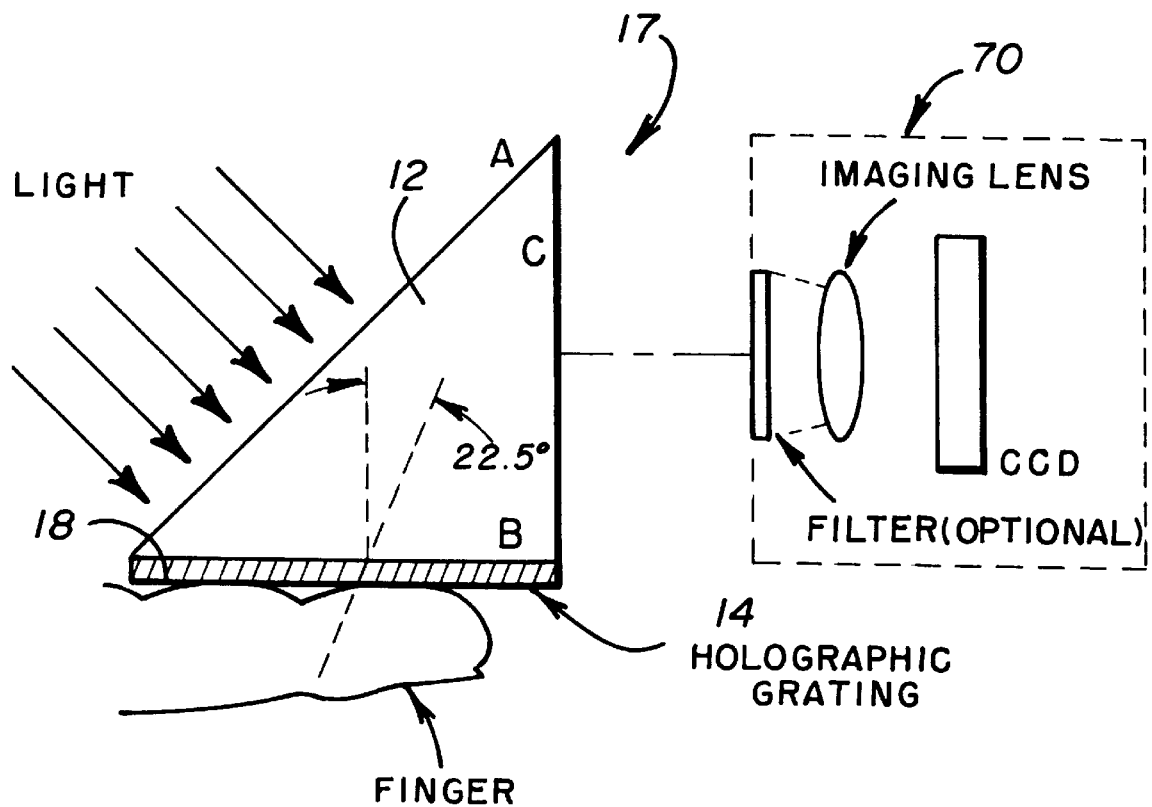
FIG. 2. is a schematic illustration showing the basic optical configuration of the preferred version of the invented fingerprint sensor where the exterior surface of the holographic phase grating functions as the sensor surface.

Looking at FIG. 2, the invented fingerprint sensor 17 also includes a right angle 45° degree prism 12 with a hypotenuse surface A, a right angle sensor surface B and a right angle transmission surface C. A holographic phase grating 14 is optically coupled to the right angle sensor surface B of the prism 12. The holographic phase grating 14 is oriented such that its diffracting fringe planes 16 diffract planar waveform light totally internally reflecting from the interior surface 18 of the grating 14 to propagate normally ($\perp$) back through the right angle transmission surface B of the prism 12.

Figure 3:
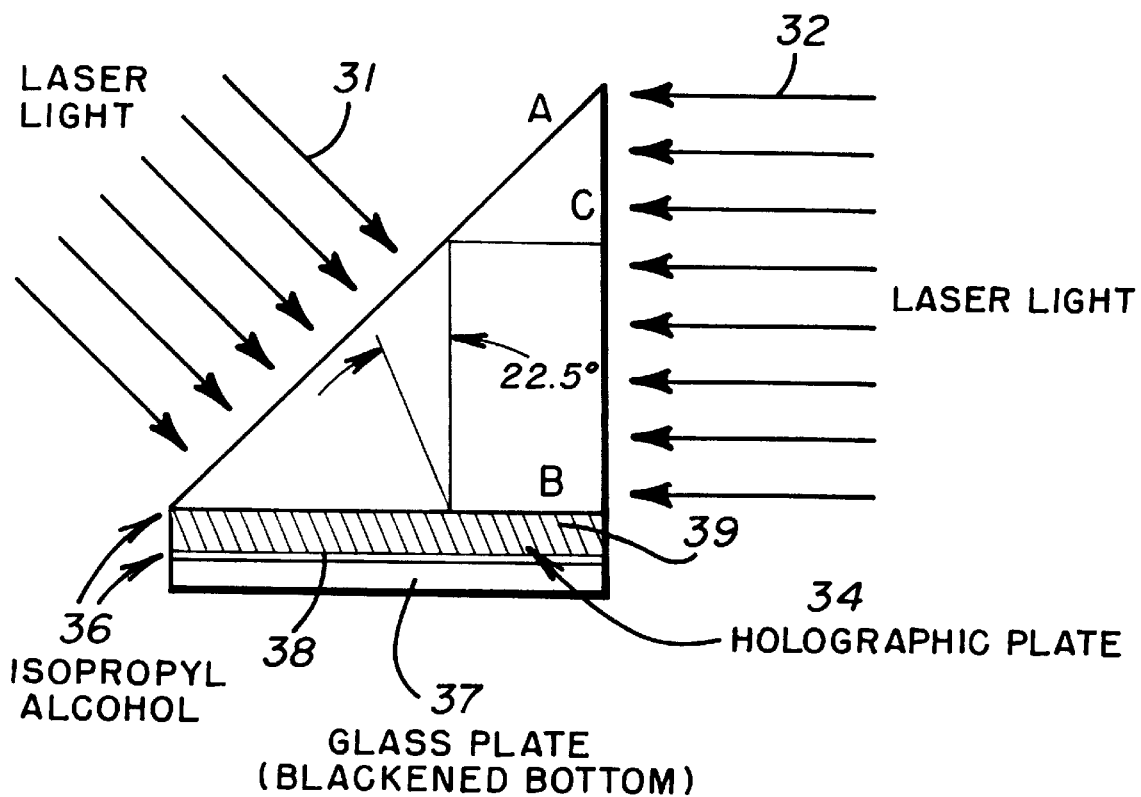
FIG. 3. schematically illustrates a preferred method for recording of the holographic phase grating.
Figure 4:
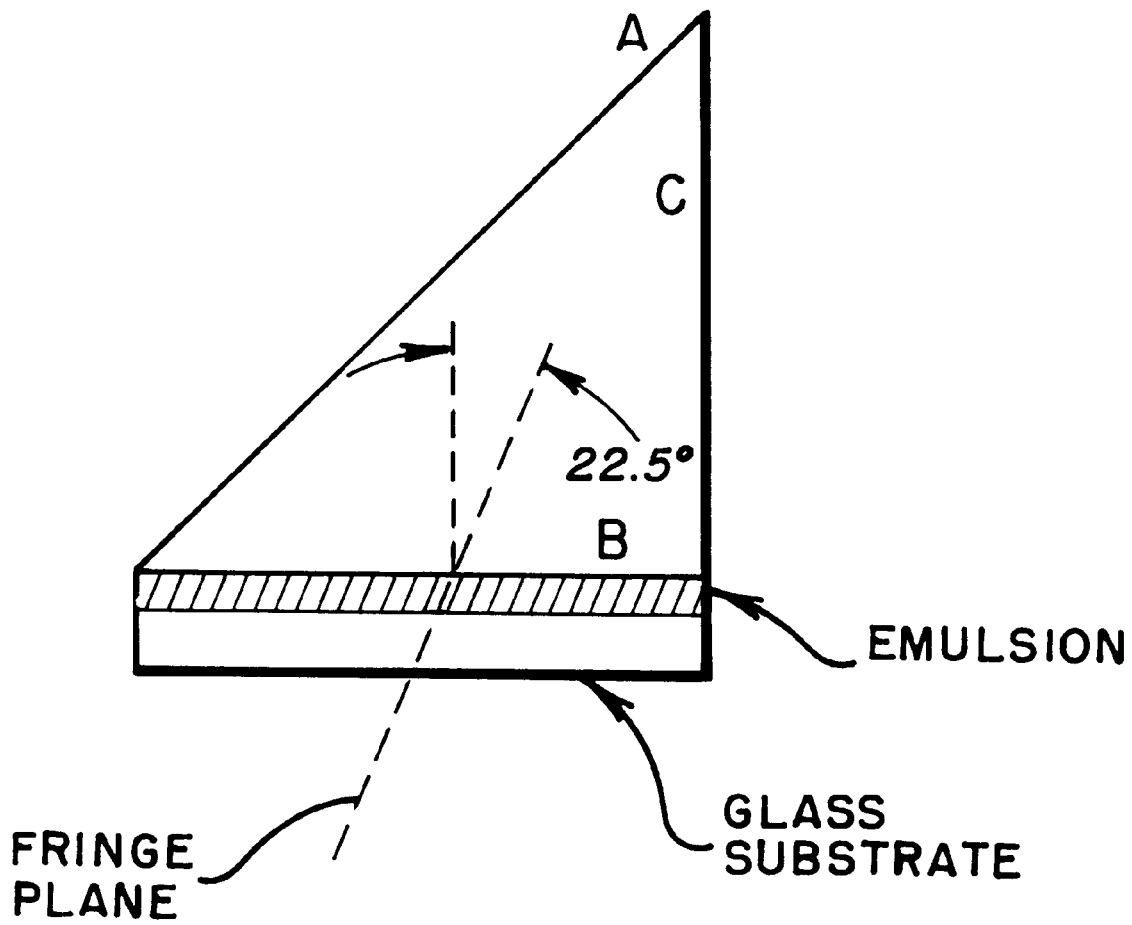
FIG. 4. depicts the orientation of the diffracting fringe planes within the emulsion of the holographic phase grating after the grating has been rotated 180° in its plane.

A suitable holographic phase grating for the invented fingerprint sensor can be recorded in several ways. A effective, yet very simple method is illustrated in FIG. 3. A collimated laser beam (not shown) is split into two constructing laser light beams 31 & 32 by amplitude division. One beam 31 is directed to normally ($\perp$) illuminate the hypotenuse surface A of the right angled prism 12 while the other beam 32 is directed to normally ($\perp$) illuminate the right angle (transmission) surface C. A holographic plate 34, e.g. an Agfa 8E75 plate for a He—Ne laser, is placed and maintained in optical contact with right angle (sensor) surface B of the prism 12. A blackened bottom glass plate 37 is placed in optical contact with the exterior surface 38 of the holographic plate 34. Layers of isopropyl alcohol 36 or other suitable liquids may be used as an optically coupling medium between the respective surfaces. The blackened bottom glass plate 37 eliminates total internal reflection of constructing beam 31 off the exterior surface 38 of the holographic plate 34. The holographic plate 34 is exposed to the two constructing laser beams 31 & 32 for an amount of time to required produce an optical density of 2. The plate 34 is then developed and bleached to provide a holographic phase grating 14. Care must be taken to ensure that the emulsion thickness of the plate 34 does not change in the chemical processing.

Figure 5:
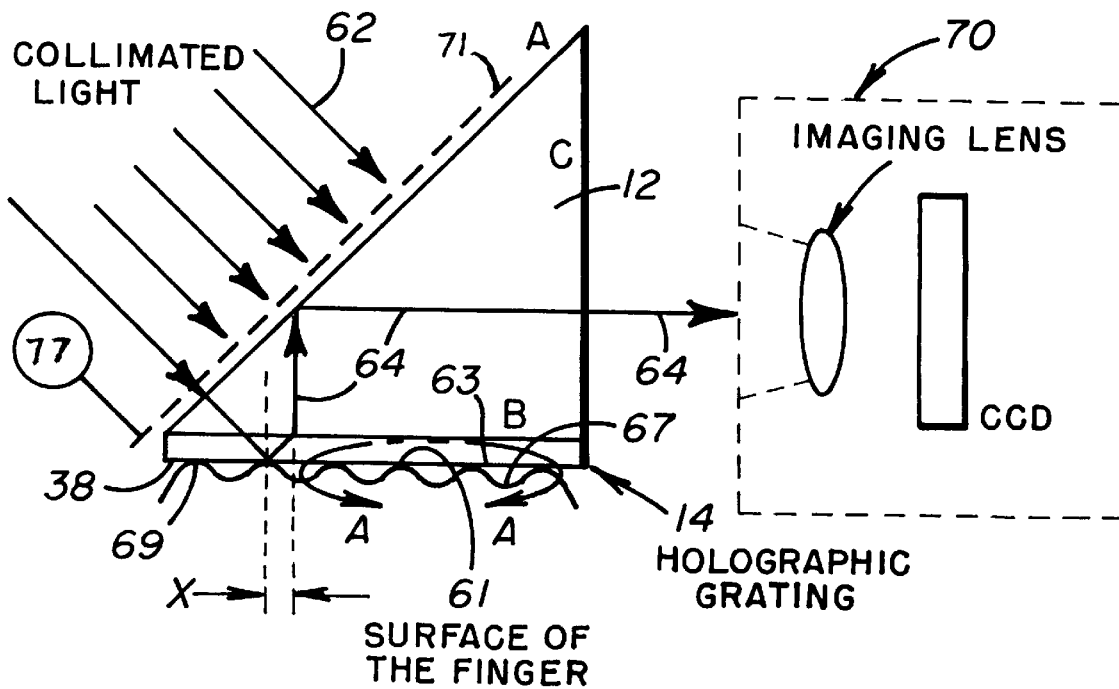
FIG. 5. illustrates factors affecting imaging of the ridges and valleys of a finger—surface interface.
Figure 5A:
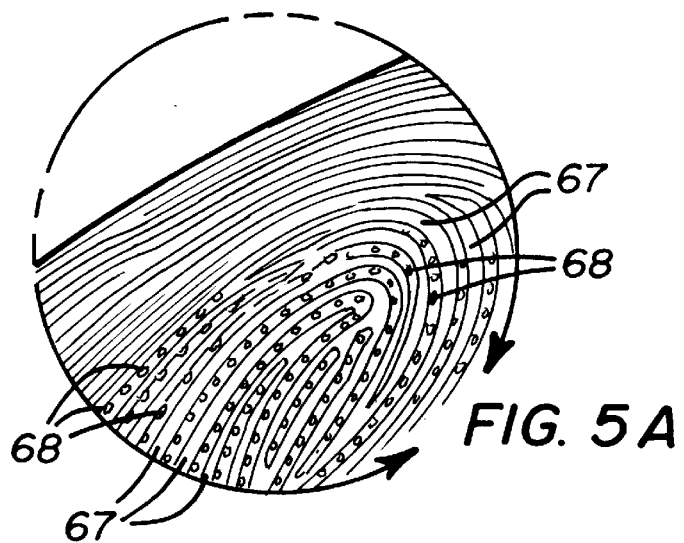
FIG. 5A illustrates details of the finger—surface interface image produced by reflected and refracted light in the plane A—A.

As shown in FIG. 3, the interference fringe planes 39 created in the developed holographic phase grating 14 incline to the left at an angle which bisects the angle between the respective incident constructing beams 31 & 32. However, as shown in FIG. 5., to diffract light totally internally reflecting off the interior surface of exterior face 38 of the developed holographic phase grating 34 in the preferred version of the invented fingerprint sensor, [FIG. 2] directing it to propagate normally ($\perp$) back into the right angle (transmission) surface B of the prism 12, the fringe planes 39 of the grating must be inclined to the right at an angle of 22.5° with respect to the normal. In particular, the developed holographic phase grating 14 must be rotated 180° (in its own plane) because light reflecting from the interior face of exterior surface 18 is rotated 180° with respect to incident light beams 31 & 32 that creating the phase grating 14. Upon rotation, the developed holographic phase grating 14 is glued to the right angle sensor surface B of that or an identical prism for the sensor shown in FIG. 2.

When constructing holographic phase gratings 14 for white light, a slight adjustment in the incident beam angle of the two constructing laser beams 31 & 32 may be necessary in order to assure that, after the grating is rotated and glued to the right angle sensor surface B of the prism, a selected or desired range of light wavelengths are diffracted perpendicularly back into the body of the prisim.

With the invented fingerprint sensor illustrated in FIG. 2 because the holographic grating 14 is physically secured (glued) to a right angle (transmission) surface B of the prism 12, mechanical shocks, vibration and the like do not affect the optical orientation of the planar waveform image emerging from the transmission surface C of the prism 12. Also, in order to assure optimal optical performance of the prism 12, holographic phase grating 14 combination, it is suggested that the particular sensor prism 12 be used in creation of its particular holographic phase grating 14.

Turning now to FIG. 5, to generate a finger print image with the invented fingerprint sensor a finger surface 61 is pressed against the holographic phase grating 14 as shown. Illuminating light rays 62 from a collimated white light source, or a laser (not shown) are directed in normal incidence to the hypotenuse surface A of the prism 12. If a laser is used, the illuminating light should be the same wavelength as used in constructing the holographic phase grating 14. The rays 62 hit the prism surface B at an angle of 45° and with minimal refraction propagate into the holographic grating 14, ideally at the same angle (45°). In particular, for optimal results, the emulsion chosen to contain the constructed holographic phase grating 14 should have a refractive index the same as or approximately the same as the refractive index of the material composing the prism 12. Accordingly, the rays 62 will totally internally reflected at the bottom surface of the holographic phase grating 14 where the valleys 67 between and pores 68 [See FIGS. 7a & 7b] in the fingerprint ridges are located. However, light rays 62 incident on the finger—surface interface 63 in areas where fingerprint ridges 69 are in contact with the exterior surface 38 of the holographic phase grating 14, refract through the finger—surface interface 63 and are in essence absorbed. The reflected rays 64 thus carry information from the finger—surface interface 63 in as a high contrast planar waveform pattern, the valleys 67 and pores 68 appearing bright and the ridges 69 dark. [See FIGS. 7a & 7b] The totally internally reflected rays 63 containing the image are diffracted by the fringe planes 39 of the holographic grating 14 (see FIG. 3) and are directed to a normal ($\perp$) orientation with respect to prism surface B rotating the plane of the contained image to an orientation parallel to that of the prism surface B. The reflected rays 64 after total internal reflection off the internal surface A of the prism 12 and emerge out through its right angle transmission surface C. The rays 64 containing the fingerprint image are then collected by a video camera system 70 and projected via a TV monitor or input into a fingerprint recognition system for recording and/or verification.[See FIG. 8.] Alternatively, the fingerprint image can be captured in film and thereafter reproduced photographically. [See FIGS. 7a–d.]

Figure 6:
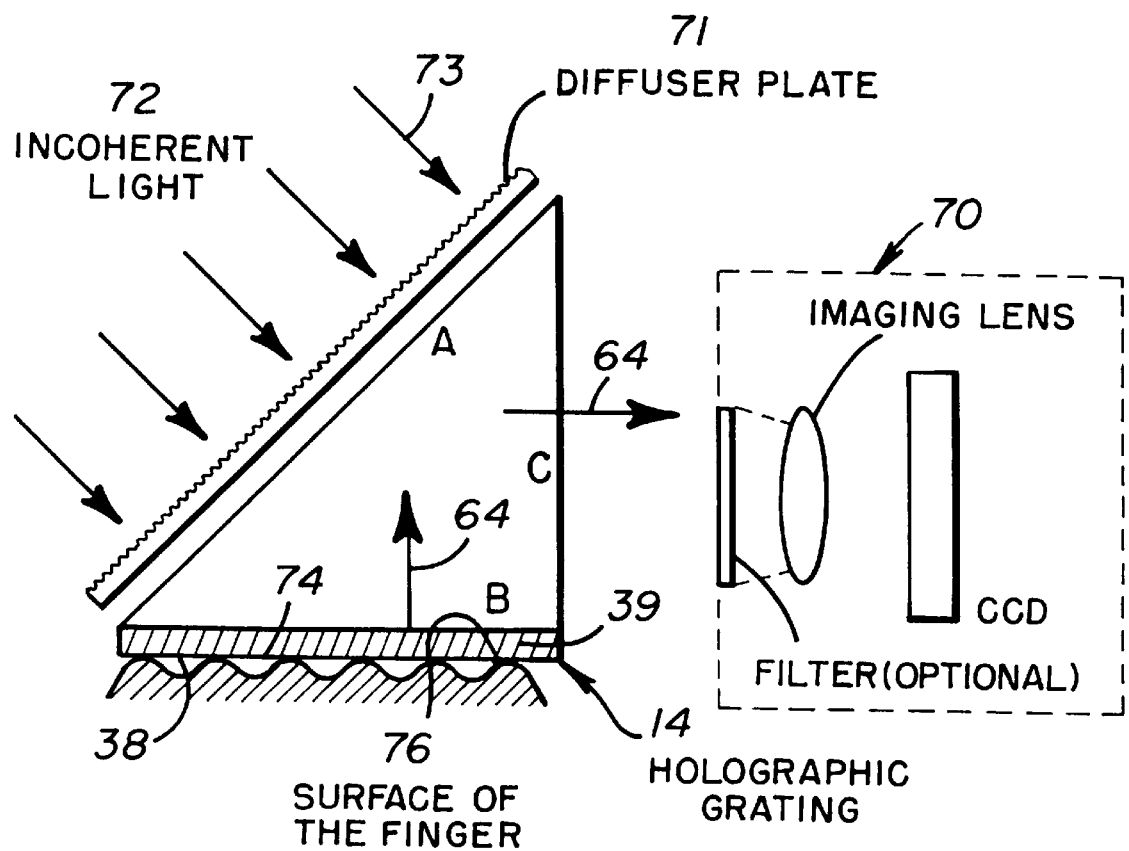
FIG. 6. schematically illustrates an embodiment of the invented sensor using diffuse light.

Turning to FIG. 6, for diffuse illumination, the invented fingerprint sensor includes a fine ground glass diffuser plate 71 placed in very close proximity (within a few millimeters or so) to the hypotenuse surface A of the prism 12. The ground glass diffuser plate 71 diffuses the light from an incoherent white light source 72. The diffused light rays 73 illuminates the interface 74 of the finger surface 76 and the exterior surface 38 of the holographic phase grating 14. As before, the diffused rays incident on the interface at angles greater than the critical angle for total internal reflection are reflected except where the fingerprint ridges contact the surface 38. All other rays of the diffused light simply partially reflect from and refracts through the exterior surface 38. The refracted light exiting through the holographic phase grating 14 is lost. And, again the fringe planes 39 of the holographic phase grating 14 diffract the totally internally reflected light rays 64 rotating or redirecting them into normal ($\perp$) incidence relative to the right angle (sensor) surface B of the prism 12. The balance of the reflected rays also diffracted by the holographic phase grating 14 will be directed at angles other than normal incidence relative to right angle sensor surface B of the prism 12. The redirected totally reflected rays 64 are again totally internally reflected from the internal hypotenuse surface A of the prim 12 and are directed normally (⊥) out the right angle (transmission) surface C of the prism. The balance of the light rays internally reflecting from the exterior surface 38 of the holographic phase grating 14 (unwanted light) will strike the internal hypotenuse surface A and either refract out or internally reflect and attenuate within the prism 12. In either case, such unwanted light rays are not aligned with the optical axis of the optical system capturing the orthogonal rays 64 containing the fingerprint image exiting the invented sensor. If laser light is used as the illuminating light source with a ground glass diffuser plate 71, the plate 71 must be rotated or oscillated at a speed high enough to average speckling out.

In particular, looking at FIG. 5, a motor or oscillator 77 is mechanically coupled to the diffuser plate 71, schematically represented by a dashed line, for rotating or oscillating the diffuser plate 71.

Figure 7A:
FIG. 7a. is a photograph showing a fingerprint image using collimated illumination.
Figure 7B:
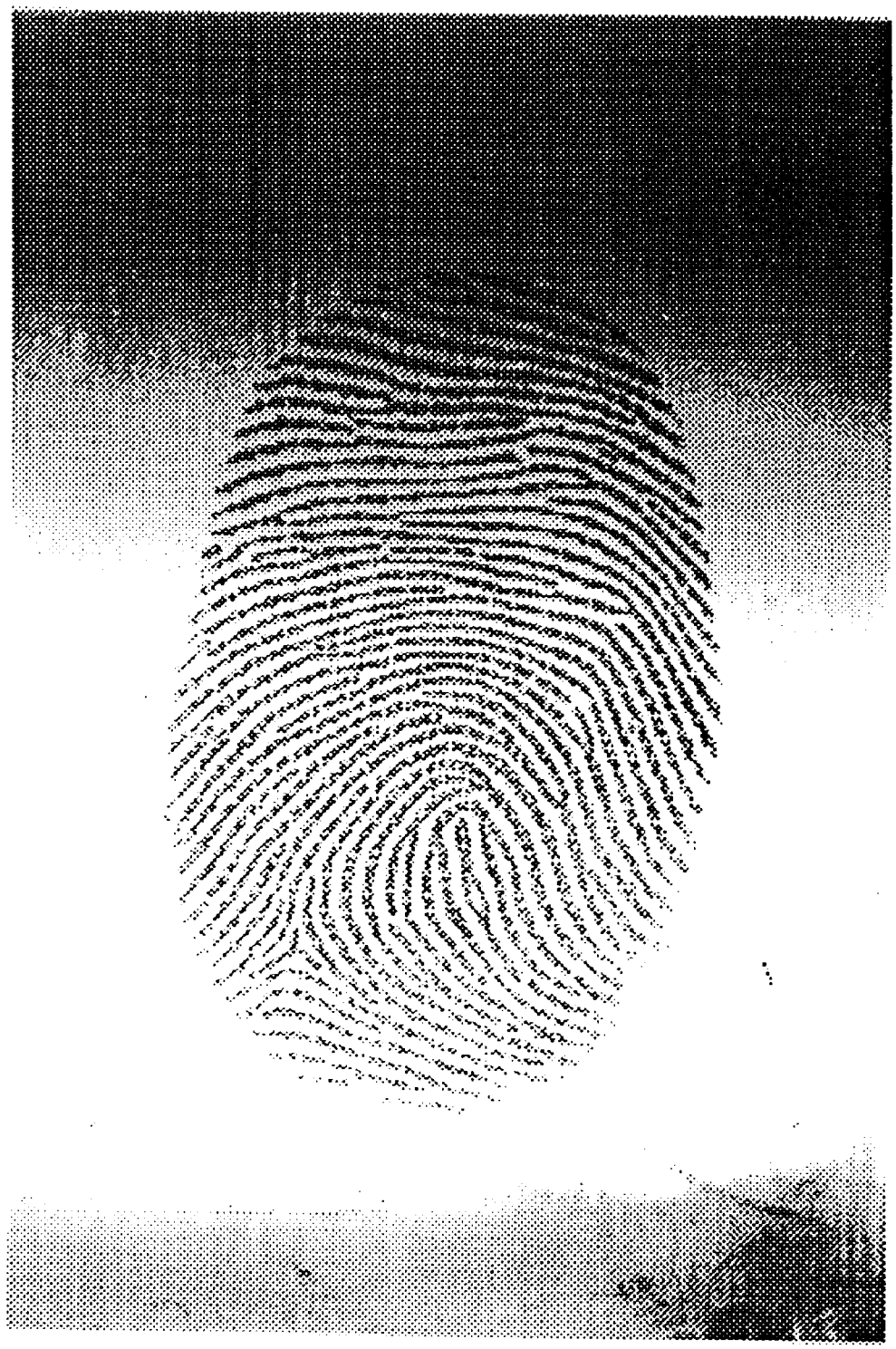
FIG. 7b. is a photograph showing the same fingerprint as in FIG. 8a. using diffuse illumination.

The quality of the fingerprint images captured by the invented fingerprint sensor as evidenced by FIGS. 7a and 7b are extremely good; even the pores 68 on the fingerprint ridges 69 are quite distinct. The image quality seems to be best when the prism is illuminated with collimated light. However, it should be noted that with collimated illumination, the right angle grating surface 38 or the hypotenuse sensor surface A of the prism 12 has to be thoroughly cleaned after each use to prevent latent fingerprints of previous users from obscuring later images. (see FIG. 7c.) With a clean prism the resolution and quality of fingerprint images generated is excellent.

With diffuse light illumination the pores 68 on the fingerprint ridge 69 are not quite as distinct, being slightly smeared along the direction of the finger 83. To explain, looking again at FIG. 5, the image of the fingerprint ridge 69 is shifted by a distance x. Because the image-shift x is different for the different angles of light incident on the finger, a point on a ridge 69 will imaged as a small line parallel to the finger. Such linear smearing is directly proportional to the thickness of the holographic phase grating, and therefore, can be reduced by using a thin hologram phase grating plates, preferably less than 0.3 mm thick. With a thin hologram phase grating 14, diffuse illumination can produce fingerprint image quality approaching that obtained with collimated illumination. Diffuse illumination has an added advantage in that the latent prints of previous users are hardly noticeable (See FIG. 7d). Also, with diffuse illumination, the fingerprint can be viewed with the naked eye without danger of eye damage over a large field of view. [The images presented in FIGS. 7a–7d are reproduced from actual photographs developed from film capturing images produced by the invented fingerprint sensor. These images demonstrate better than words can describe high quality of fingerprint images that are obtainable using the invented fingerprint sensor.]

A ground glass diffuser plate 71 producing a diffuse light source for illuminating the finger surface—sensor surface interface also presents substantial advantages in fingerprint verification systems diagrammed in FIG. 8. In particular such systems typically utilize a converging wavefront carrying information from the actual fingersurface which is operated on by a holographic filter to reproduce an output beam similar to a reference beam used in creating the filter. The output beam is focused by a lens and sensed a photo detectors. The magnitude of the signal produced by the dectector indicates a match or mismatch. (See Caulfield et al, and U.S. Pat. Nos. 5,138,468 & 5,095,194 J. Barbanell)

An observed Achilles heel of such verification systems is that cleaning the input or sensing interface surface of the fingerprint sensor with a liquid, such as isopropyl alcohol, often leaves a distribution of streaks on the input sensing interface. The streaks diffract the illuminating collimated light flux into diffraction patterns which are collected and directed along the verification optical path of the system. Because both the flux and incidence of such diffraction patterns are distributed across the entire field of view operated on by the holographic Fourier-transform filter elements, there is a relatively high probability, that output reference beams of the filter element may be reproduced triggering a false verification.

In contrast, when the light illuminating such liquid-air interface at a sensor surface is diffused, the streaks are smoothed out reducing angles of diffraction to very low values. In other words, the diffuse light rays diffracted by streaks are concentrated along the optical axis of the system which typically is blocked at the hologram plane, Accordingly, the chance of a false verification is essentially eliminated.

Figure 7C:
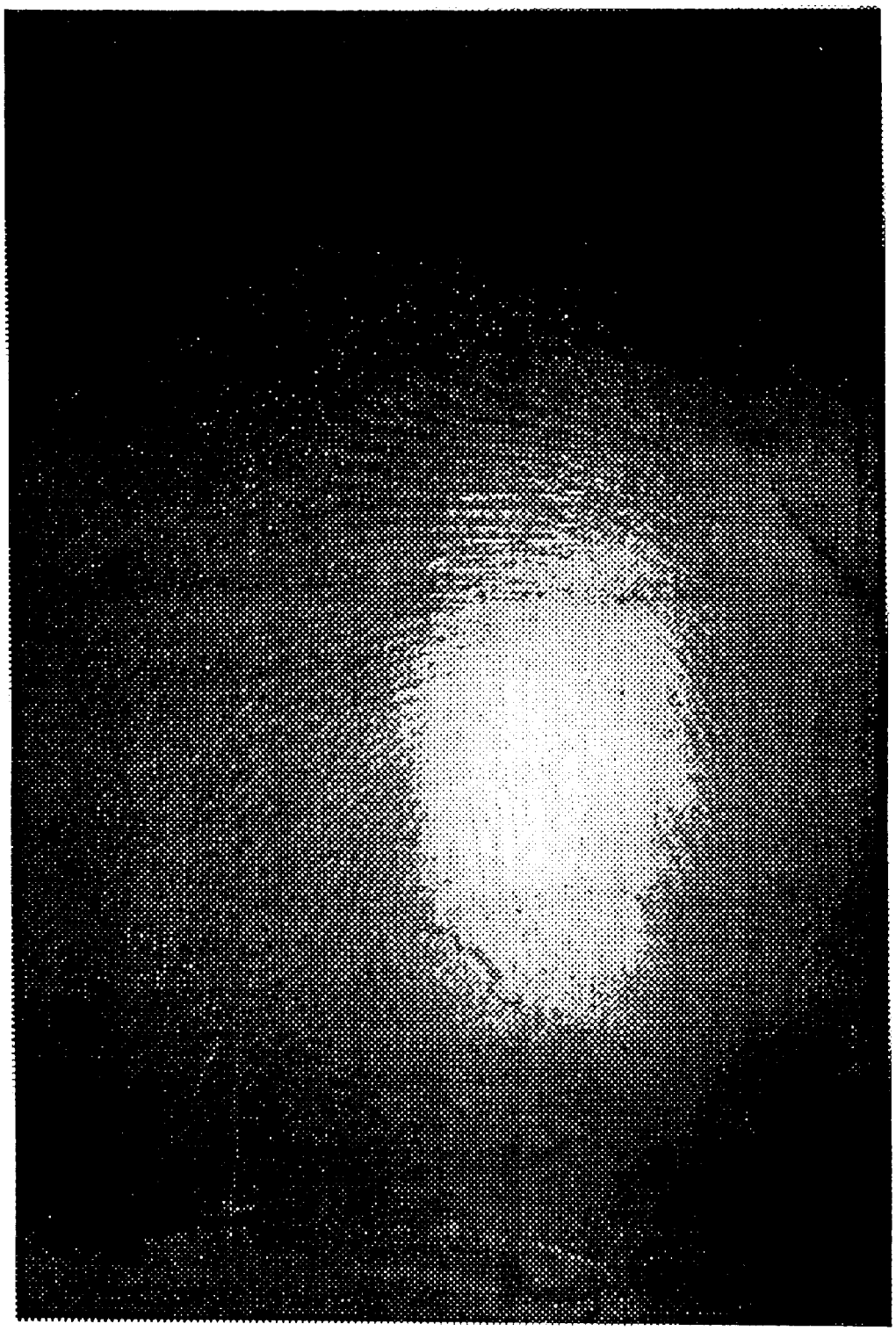
FIG. 7c. is a photograph showing a latent image of a fingerprint after the finger is removed from the sensor surface of the holographic phase grating of the invented sensor using collimated illumination.
Figure 7D:
FIG. 7d is a photograph showing a hardly noticeable latent image of a fingerprint after the finger is removed from sensor surface of the holographic phase grating of the invented sensor using diffuse illumination.

To a degree, the above described phenomenon is also illustrated by the photographs presented as FIGS. 7c and 7d which depict latent fingerprint images picked up from the sensor surface of the preferred version of the invented sensor after the finger has been removed. In particular, the latent fingerprint image of FIG. 7c produced with collimated illuminating light source has greater contrast than that of FIG. 7d produced with diffuse light.

The invented fingerprint sensor and method for constructing the associated holographic phase grating has been described in context of both representative and preferred embodiments. There are many modifications and variations can be made to the invented stop which, while not exactly described herein, fall within the spirit and the scope of invention as described and set forth in the appended claims.

We claim:

1. A method for recording a planar holographic phase grating plate for diffracting and redirecting light totally internally reflecting from a first face perpendicularly back through a second face parallel the first face comprising the steps of:

a) sandwiching an unexposed holographic plate having first and second parallel planar faces optically between one right angle transmission surface of a right angled prism having a hypotenuse surface and two right angle surfaces, and a blackened glass plate using a suitable liquid optical coupling medium including isopropyl alcohol, with the second planar face adjacent the right angle surface of the prism and the first planar face adjacent to the blackened glass plate;

b) exposing the holographic plate using a collimated coherent light beam split by amplitude division into a first constructing light beam directed normally into the hypotenuse surface of the right angle prism for refracting into the holographic plate at an angle of refraction θ greater than a critical angle for total internal reflection from the first face of the holographic plate, and a second constructing light beam directed normally into the remaining right angle surface of the prism for totally internally reflecting off the hypotenuse prism surface to propagate toward normal (⊥) incidence with and into the holographic plate for generating fringe planes within the plate oriented at an angle bisecting the angle between the respective constructing beams within the holographic plate;

(c) removing, developing and bleaching the exposed holographic plate to provide a planar holographic phase grating; and (d) rotating the holographic phase grating 180° in a plane parallel its respective faces, whereby, light refracting into the second face of the developed holographic phase grating in the same direction as the first constructing light beam at an angle greater than the critical angle for total internal reflection reflects internally from the first face of the holographic phase grating and is diffracted by the fringe planes to propagated perpendicularly back out its second face.

2. The method for recording a planar holographic phase grating plate of claim 1 wherein the holographic plate is exposed to the first and second constructing light beams for an amount of time to required produce an optical density of 2.

3. The method for recording a planar holographic phase grating plate of claim 1 wherein the right angle prism, the unexposed holographic plate and the resulting holographic phase grating all have an approximately equal index of refraction.

4. The method for recording a planar holographic phase grating plate of claim 1 wherein the unexposed holographic plate and the resulting planar holographic phase grating have an approximately equal thickness that is less than 0.3 mm.

5. A method for recording a planar holographic phase grating plate for diffracting and redirecting a selected range of light wavelengths of white light totally internally reflecting from a first face back through a second face parallel the first face in a selected direction comprising the steps of:

a) sandwiching an unexposed holographic plate having first and second parallel planar faces optically between one right angle transmission surface of a right angled prism having a hypotenuse surface and two right angle surfaces, and a blackened glass plate using a suitable liquid optical coupling medium including isopropyl alcohol, with the second planar face adjacent the right angle surface of the prism and the first planar face adjacent to the blackened glass plate;

b) exposing the holographic plate by:

(i) producing a collimated coherent light beam using a laser;

(ii) splitting the collimated coherent light beam by amplitude division into a first constructing light beam, and a second constructing light beam;

(iii) directing the first constructing light beam into the hypotenuse surface of the right angle prism for refracting into the holographic plate at an angle of refraction $\theta$ greater than a critical angle for total internal reflection from the first face of the holographic plate;

(iv) directing the second constructing light beam into the remaining right angle surface of the prism for totally internally reflecting off the hypotenuse prism surface to propagate toward approximate incidence at the selected direction with and into the holographic plate;

(v) adjusting respective angles at which the first and second constructing light beams are directed into the hypotenuse and right angle surfaces of the prism for generating fringe planes within the holographic plate at a particular angle $\phi$ chosen for diffracting the selected range of light wavelengths;

(c) removing, developing and bleaching the exposed holographic plate to provide a planar holographic phase grating: and (d) rotating the holographic phase grating 180° in a plane parallel its respective faces, whereby, the selected range of light wavelengths of white light refracting into the second face of the developed holographic phase grating in the same direction as the first constructing light beam at an angle greater than the critical angle for total internal reflection reflects internally from the first face and is diffracted by the fringe planes to propagate in the selected direction back out the second face.

* * * * *